Patented July 19, 1932

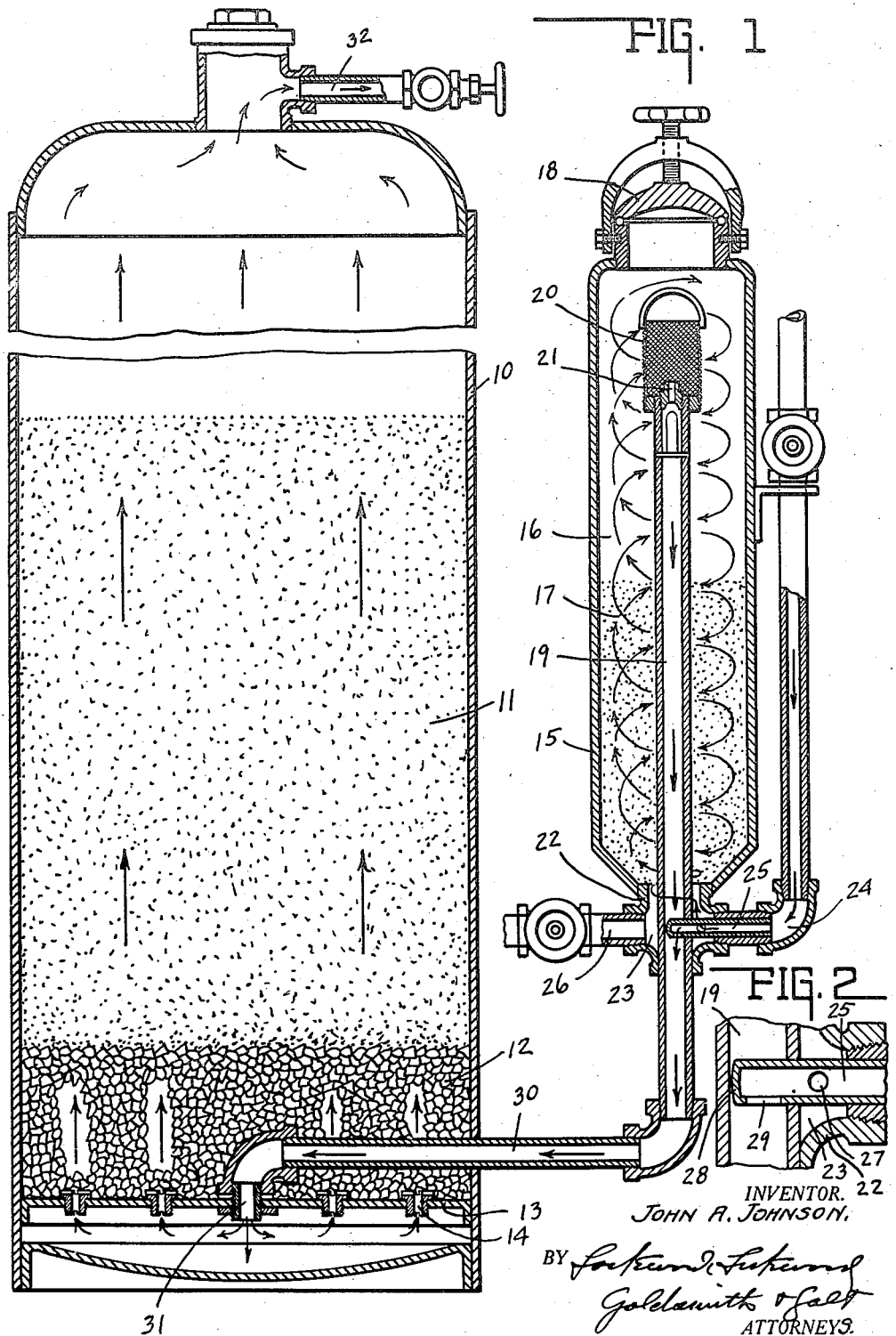

1,867,572

UNITED STATES PATENT OFFICE

JOHN A. JOHNSON, OF CRAWFORDSVILLE, INDIANA

APPARATUS FOR REGENERATING WATER SOFTENING MATERIALS

Application filed February 16, 1929. Serial No. 340,366.

This invention relates to a water softener of that type employing a zeolite which must periodically be regenerated by passing salt brine therethrough.

The object of the invention is to provide a regenerating means for the zeolite which will more efficiently act thereon. This is accomplished by diluting the salt brine so as to pass approximately a 5% solution of brine through the zeolite as distinguished from a highly concentrated brine obtained in the usual dissolution of salt and water. It has been found that wherein the common practice has been to pass water through a salt pot containing a quantity of salt and thence through the zeolite, whereby a comparatively concentrated brine solution is employed, that a more efficient regeneration is obtained by passing a diluted brine through the zeolite comprising approximately 5% salt and 95% water.

With the old type of salt pot, the salt was put in at the top and the water admitted dissolving the salt, forming a concentrated brine which was forced through the mineral bed.

One feature of this invention contemplates the provision of a salt dissolving chamber in which only a portion of the water to be discharged through the zeolite is admitted at the bottom for dissolving the salt contained in the chamber, which relatively small amount of concentrated brine formed thereby is discharged with the remaining portion of the fresh water so as to mix therewith into a relatively dilute solution before passing through the mineral bed or zeolite.

This is accomplished by by-passing approximately 20% of the volume of water to be discharged through the zeolite bed, through the dissolving chamber containing a quantity of salt so that at the end of the by-pass this relatively small quantity of water comprising a high concentration of brine will be carried back into the main water passage to be absorbed by the greater amount of fresh water, thus obtaining a dilute solution of brine for regenerative purposes.

Another feature of the invention resides in the particular construction for by-passing a predetermined portion of the fresh water through the dissolving chamber in a convenient and simplified manner, and also causing a swirling action thereof which tends to keep the salt contained in said chamber in suspension and thereby accelerating the process of dissolving the salt while at the same time insuring thorough mixing and cleansing of the chamber walls.

Another feature of the invention resides in the arrangement of the regenerating tank and the discharge conduit extending upwardly therein and provided with a screen at the top for eliminating the flow of sand and dirt usually found in the salt, into the water softener so as to foul the mineral bed and clog the gravel bed, thereby preventing the proper diffusion of the water through the softener.

By means of this arrangement, not only will the foreign matter be prevented from entering the discharge pipe, but will settle at the bottom of the chamber where it may be readily removed.

The full nature of the invention will be more clearly understood from the accompanying drawing and the following description and claims:

Fig. 1 shows the apparatus in central vertical cross section. Fig. 2 is an enlarged central vertical section through the discharge nozzle.

In the drawing there is shown a water softener tank 10 having a water softening content or zeolite bed 11 therein supported upon a gravel bed 12 by the bottom plate 13 in which there are provided a plurality of nozzles 14.

Associated with said tank there is a regenerating tank 15 including a dissolving chamber 16 containing a quantity of salt 17. The top of said chamber is open and adapted to be closed by the plug 18. Extending centrally and vertically into said chamber from the bottom to a position near the top thereof there is a standpipe 19 which acts as a discharge for the brine from said chamber. Said standpipe is provided at its upper end with a screen 20 surrounding the opening 21 in the top of said pipe.

Surrounding said standpipe 19 and connected with the lower tapered end of the regenerating tank 15 there is a two-way pipe fitting 22 which provides an annular chamber 23 surrounding said standpipe and in communication with the bottom of the chamber 16. Connected with said fitting there is a fresh water pipe 24 in which the fresh water discharge nozzle 25 is mounted, which nozzle extends into said standpipe through a suitable opening in the side thereof. A drain pipe 26 closed by a suitable valve is connected with said fitting in communication with the chamber 23.

As best illustrated in Fig. 2 there is a discharge opening 27 in the side of the nozzle 25 which is in direct communication with the chamber 23. The end of the nozzle is closed as at 28 while in the bottom thereof there is an opening 29 which is in direct communication with the standpipe 19 and directed downwardly with respect thereto. It will be noted that the opening 27 is approximately one-fourth of the area of the opening 29 so that approximately 20% of the fresh water forced through the nozzle is discharged through the opening 27 in a swirling motion about the chamber 23 while the balance of approximately 80% of the fresh water is directed downwardly through the lower end of the standpipe 19. The water passing through the opening 27 will be caused to swirl about the dissolving chamber 16 and rise therein, dissolving the salt so that upon reaching the top of the standpipe and passing through the screen 20 and downwardly through the standpipe 19 it will be of a relatively high concentration. As this highly concentrated brine passes the end of the nozzle 25, it joins the 80% fresh water and is mixed therewith so as to pass through the pipe 30 and be discharged under the plate 13 by the nozzle 31, from whence it will rise upwardly through the zeolite solution 11 in a dilute state and out through the discharge pipe 32 at the top of the tank 10.

From the foregoing it will be noted that by reason of the comparative sizes of the water discharge orifices 27 and 29 a substantially predetermined concentration of brine may be obtained, which brine will be free from foreign matter. This is true in view of the pressure of the usual city water causing the fresh water to be discharged from the nozzle 25 through said orifices under such pressure as to properly divide it, while at the same time the city water pressure will cause the swirling action due to the position of the orifice 27 which facilitates the dissolution of the salt in the chamber 16. This dilute solution of brine as compared with the more concentrated solutions used will more efficiently regenerate the zeolite upon being discharged therethrough.

The invention claimed is:

1. The combination with a water softener tank containing a bed of zeolitic substance therein, of means for regenerating the same, comprising a dissolving chamber associated therewith for containing a quantity of salt, a conduit for conducting a salt solution to be discharged through said substance having one end open to the contents of said chamber, a fresh water supply line and a nozzle connected with said line having an orifice in the side thereof in communication with said chamber and an orifice adjacent the discharge end therof communicating with said conduit, whereby a portion of the water will be passed through the salt in said chamber into said conduit to mix with the fresh water therein so as to be diluted thereby.

2. The combination with a water softener tank containing a bed of zeolitic substance therein, of means for regenerating the same comprising a dissolving chamber associated therewith for containing a quantity of salt, a conduit for conducting a salt solution to be discharged through said substance, said conduit extending upwardly through the salt in said chamber and open to the contents thereof, a fresh water supply line having a discharge nozzle provided with an orifice in the side thereof communicating with said chamber, and an orifice of greater area communicating with said conduit, whereby a greater portion of the fresh water will be discharged into said conduit and a smaller portion thereof will be by-passed through the salt in said chamber into the conduit at the upper open end thereof.

3. The combination with a water softener tank containing a bed of zeolitic substance therein, of means for regenerating the same comprising a dissolving chamber associated therewith for containing a quantity of salt, a standpipe extending upwardly into said chamber through the salt contained therein having an inlet at the top thereof, a protective screen about said inlet, a conduit connecting the lower end of said standpipe with said water softener tank, a fresh water supply line, a discharge nozzle connected therewith, said nozzle being provided with a discharge orifice communicating with said standpipe for directing fresh water downwardly therethrough, and an orifice of lesser dimensions in the side thereof in communication with the interior of said chamber adapted to discharge a lesser portion of fresh water in a swirling motion about said standpipe for dissolving the salt and carrying a concentrated solution through the upper inlet thereof to be mixed with and diluted by the fresh water discharged into said pipe from the end orifice of said nozzle.

4. The combination with a water softener tank containing a bed of zeolitic substance therein, of means for regenerating the same comprising a dissolving chamber associated therewith for containing a quantity of salt, a standpipe extending upwardly into said chamber terminating above the upper level of the salt contained therein and having an inlet at the top thereof, said standpipe being connected with the lower portion of said water softener tank for discharging a solution of brine therein, a protective screen surrounding the inlet at the top of said standpipe, and means for discharging fresh water into the bottom of said tank externally of said standpipe so as to cause the same to pass upwardly about said standpipe and through the salt contained in said chamber to be discharged through the top of said standpipe, whereby insoluble and foreign substance will be prevented from passing into said softener tank.

5. The combination with a water softener tank containing a bed of zeolitic substance therein, means for regenerating the same comprising a dissolving chamber for containing a quantity of salt, a standpipe therein terminating in an inlet in the upper portion of said chamber above the level of the salt contained therein for providing a brine outlet for the tank, a screen covering the standpipe inlet, means for passing water upwardly through the salt contained in said chamber for causing a solution of brine to be discharged from the upper portion thereof through said standpipe, whereby the insoluble and foreign substance contained in said chamber will accumulate in the bottom thereof and not pass through said standpipe into said tank, and means connected with the bottom of said chamber for removing such accumulation of material therefrom.

In witness whereof, I have hereunto affixed my signature.

JOHN A. JOHNSON.